US012528717B1

(12) United States Patent
Kurlagunda (10) Patent No.: US 12,528,717 B1
(45) Date of Patent: Jan. 20, 2026

(54) DOME-SHAPED SOLAR WATER PURIFICATION SYSTEM

(71) Applicant: Adrith Kurlagunda, Fremont, CA (US)

(72) Inventor: Adrith Kurlagunda, Fremont, CA (US)

(*) Notice: Subject to any disclaimer, the term of this patent is extended or adjusted under 35 U.S.C. 154(b) by 0 days.

(21) Appl. No.: 19/214,836

(22) Filed: May 21, 2025

(51) Int. Cl.
*C02F 1/14* (2023.01)
*C02F 1/00* (2023.01)

(52) U.S. Cl.
CPC .............. *C02F 1/14* (2013.01); *C02F 1/008* (2013.01); *C02F 2201/005* (2013.01); *C02F 2209/02* (2013.01)

(58) Field of Classification Search
CPC ...... C02F 1/008; C02F 1/14; C02F 2201/005; C02F 2209/02
See application file for complete search history.

(56) References Cited

U.S. PATENT DOCUMENTS

| | | | | |
|---|---|---|---|---|
| 2,636,129 A * | 4/1953 | Agnew | ............... | C02F 1/046 |
| | | | | 159/902 |
| 3,351,536 A * | 11/1967 | Fox | ............... | C02F 1/14 |
| | | | | 202/202 |
| 3,397,117 A * | 8/1968 | Smith | ............... | B63C 9/06 |
| | | | | 52/2.21 |
| 3,415,719 A * | 12/1968 | Telkes | ............... | C02F 1/14 |
| | | | | 159/904 |
| 4,057,048 A * | 11/1977 | Maine | ............... | F24S 23/00 |
| | | | | 126/648 |
| 4,134,393 A * | 1/1979 | Stark | ............... | C02F 1/14 |
| | | | | 126/714 |
| 4,159,711 A * | 7/1979 | Johnson | ............... | F24S 10/60 |
| | | | | 126/646 |
| 4,270,981 A * | 6/1981 | Stark | ............... | C02F 1/14 |
| | | | | 202/180 |

(Continued)

FOREIGN PATENT DOCUMENTS

| | | | | |
|---|---|---|---|---|
| WO | WO-0177455 A1 * | 10/2001 | ............ | E04B 1/3211 |
| WO | WO-2009105587 A2 * | 8/2009 | ............ | F03G 6/066 |

OTHER PUBLICATIONS

Espacenet Machine Translation of WO 0177455 Obtained Oct. 17, 2025. (Year: 2025).*

*Primary Examiner* — Jonathan Miller
(74) *Attorney, Agent, or Firm* — Law Office of John Stattler (57) ABSTRACT

Apparatus, systems and methods are provided for a solar heater water purification system. The water purification system includes an icosahedron dome that houses a plurality of Fresnel lenses aligned with multiple facets of the icosahedron dome, wherein the concentrator lenses concentrate light at the base of the dome throughout the day without the need for a mechanical tracker. The water purification system also includes a water transportation system, located at the base of the dome-shaped structure, comprising a spiral-shaped coil of metal tubes which receives dirty water and exposes a small volume of the water to be heated by the concentrated light at the base of the icosahedron dome. The water purification system is under control of a smart controller with a temperature sensor that causes the water transportation system to output purified water when the water reaches a specified temperature for a specified period of time.

9 Claims, 6 Drawing Sheets

(56) References Cited

U.S. PATENT DOCUMENTS

| | | | | |
|---|---|---|---|---|
| 4,289,119 A * | 9/1981 | Meyer, Sr. | ............... | F24S 23/30 |
| | | | | 126/674 |
| 4,341,203 A * | 7/1982 | Bloxsom | ................. | F24S 23/30 |
| | | | | 126/698 |
| 4,341,204 A * | 7/1982 | Bloxsom | ................. | F24S 20/20 |
| | | | | 126/698 |
| 4,356,813 A * | 11/1982 | Hoffman | ................. | F24S 23/70 |
| | | | | 126/684 |
| 5,053,110 A * | 10/1991 | Deutsch | .................... | C02F 1/14 |
| | | | | 203/1 |
| 7,494,572 B2 * | 2/2009 | Tonkin | ...................... | C02F 1/14 |
| | | | | 210/640 |
| 9,327,207 B2 * | 5/2016 | Al-Garni | ................. | C02F 1/04 |
| 9,517,950 B2 * | 12/2016 | Munro | ...................... | C02F 1/14 |
| 9,808,737 B2 * | 11/2017 | Hsia | ...................... | B01D 1/0005 |
| 11,112,144 B2 * | 9/2021 | Suryawanshi | .......... | F24S 70/60 |
| 11,772,988 B1 * | 10/2023 | Alnaimat | ................. | C02F 1/14 |
| | | | | 202/163 |
| 2002/0166294 A1 * | 11/2002 | Rogers | ................... | E04B 7/102 |
| | | | | 52/81.4 |
| 2014/0231327 A1 * | 8/2014 | D'Alba | ............... | B01D 5/0066 |
| | | | | 210/175 |
| 2016/0151720 A1 * | 6/2016 | Hsia | ..................... | B01D 1/0005 |
| | | | | 202/172 |

\* cited by examiner

DOME-SHAPED SOLAR WATER PURIFICATION SYSTEM

FIELD OF THE INVENTION

The present invention pertains to the field of solar-powered water purification, and more particularly, to systems that employ concentrated solar thermal energy to facilitate the purification of water.

BACKGROUND

Access to clean water is a basic and fundamental human right. Yet, according to WHO, one in three people globally do not have access to safe drinking water[1].

In many places, water is often contaminated with infectious microorganisms, including bacteria, viruses, and protozoans, which are harmful to human health. According to WHO[2,] heating water to over 65° C. for a short period is effective in killing many of these harmful microorganisms.

In many places, people boil water on a stove to sterilize it. This process is labor-intensive, requires a lot of energy, and is costly.

While solar energy is commonly employed for heating water, existing solar-powered water purification systems generally fall into two categories: compact, handheld devices utilizing ultraviolet (UV) light for disinfection, and systems powered by photovoltaic solar panels that generate electricity to operate purification mechanisms. Handheld UV-based purifiers, although user-friendly, are limited in effectiveness as they only target a subset of waterborne pathogens. In contrast, solar panel-based systems, which rely on the indirect conversion of sunlight into electricity and subsequently into thermal energy, are often complex, inefficient, and subject to significant energy losses during the conversion process.

An alternative method involves the use of concentrated solar thermal energy for water purification. These systems typically employ optical components, such as Fresnel lenses or parabolic mirrors, to focus solar radiation onto a vessel containing water, thereby raising its temperature for disinfection. While this direct conversion of solar energy into thermal energy offers high thermodynamic efficiency, the requirement for large-area lenses to achieve sufficient heating of bulk water volumes renders such systems cost-prohibitive, particularly in resource-limited settings. Moreover, the intense thermal concentration produced by large lenses can create localized high-temperature zones, posing significant safety risks that hinder their practical and commercial deployment.

A second issue with concentrator systems is that the lenses need to track the sun throughout the day, making these systems mechanically complex, expensive, and requiring constant maintenance.

Furthermore, the need for precise solar alignment necessitates extensive site preparation and analysis to determine optimal locations for their installation, which can vary depending on the region of the world and the location on the property where they are being installed.

If the three key problems identified above (1) a need for a large Fresnel lens, (2) the need to mechanically track the sun throughout the day, and (3) the complexity of installation is eliminated, it would substantially reduce the cost of these systems and they can be deployed in regions of the world that need such systems but cannot afford it.

SUMMARY OF THE DISCLOSURE

This disclosure describes a novel method for effectively purifying water using a Fresnel lens, eliminating the need for tracking the sun. The system consists of three elements (1) a collapsible dome-shaped solar concentrator that tracks the sun throughout the day without the need for any mechanism, (2) a coil-based water transportation system that enables a small volume of water to be heated at any location reducing the need for large Fresnel lenses, and (3) an intelligent controller that regulates the flow of water continuously through the water transportation system and ensures that the water coming out of the system reaches the desired temperature.

A dome concentrator is key to enabling the automatic tracking of the sun throughout the day without the need for a tracking system. The dome-shaped concentrator is composed of multiple facets, or sides, that house concentrator lenses, which concentrate light at the base of the dome. Depending on the time of day and the sun's position, different facets of the dome will be automatically aligned to the sun, allowing the system to track the sun and eliminating the need for a tracking mechanism. Such a design also makes these systems very easy to set up, as the installation can be made without the need to ensure optimal positioning or orientation of the structure, which is typically required for most concentrator systems.

Since a dome-shaped structure is large and challenging to transport in its assembled form, this disclosure proposes a collapsible dome design that allows the dome to be collapsed into its various facets or sides, which can be reassembled on site and stacked for easy transportation. These facets or sides are then easily assembled on-site to create a large dome.

A second important element of this invention is its water transportation system. Most concentrator systems concentrate light on a large body of water in a container to heat it. However, since water is not a good conductor, heating a large body of water requires a significant amount of heat, necessitating a very large Fresnel lens. Large Fresnel lenses pose two key problems: cost and safety. First, the cost of the lenses can become prohibitively high as the size of the lenses increases. This makes it infeasible to deploy these systems in many regions of the world where there is a critical need for such systems, but where they cannot afford expensive systems. Secondly, large Fresnel lenses concentrate tremendous power in a small area, which could pose a safety hazard if the lenses get moved or rotated accidentally and the focal point moves outside the dome. By creating a spiral-shaped coil using metal tubes, like copper tubes, for example, that transport water from one end of the system out to the other end, we can effectively enable the heating of a small cross-section of water at the location on the base where the light is concentrated, thereby allowing the water to reach the desired temperature quickly. This allows for localized heating of water much more effectively with smaller concentrator lenses as opposed to heating a large body of water using very large Fresnel lenses. The copper coil at the base can also be painted black to absorb heat better and raise the temperature of the water quickly.

A key last element of this innovation is the controller system. To ensure sufficient heating of water to 65° C., which is required to kill pathogens in water, we must ensure that the water reaches this temperature before exiting the water purification system. This is done using sensors and a controller. The system is designed with a temperature sensor, which is placed at the exit of the spiral copper tube. The temperature sensor is connected to a solenoid valve that opens when the required temperature is achieved via the controller system. The controller can be programmed to maintain the water at the specified temperature for a specified period, ensuring sufficient water is released when the valve is opened.

These three elements described above (concentrator dome, coil-based water transportation system, and smart controller) work together to create an effective water purification system. The dome concentrator ensures that light is concentrated at the base of the dome throughout the day without the need for a mechanical tracker, the coil transportation system ensures that a small quantity of water is heated at the point of concentration enabling the water to attain the required temperature quickly, and the smart controller which ensures that the water is not let out of the system till the desired temperature to purify the water is reached.

BRIEF DESCRIPTION OF THE DRAWINGS

FIG. 1b, FIG. 1c, and FIG. 1d show three types of connectors used to build the dome in FIG. 1a.

DETAILED DESCRIPTION

A series of three key innovations described in this disclosure work in tandem to enable an innovative, low-cost, collapsible, transportable, easy-to-set-up, and low-maintenance system.

Figure 1A:
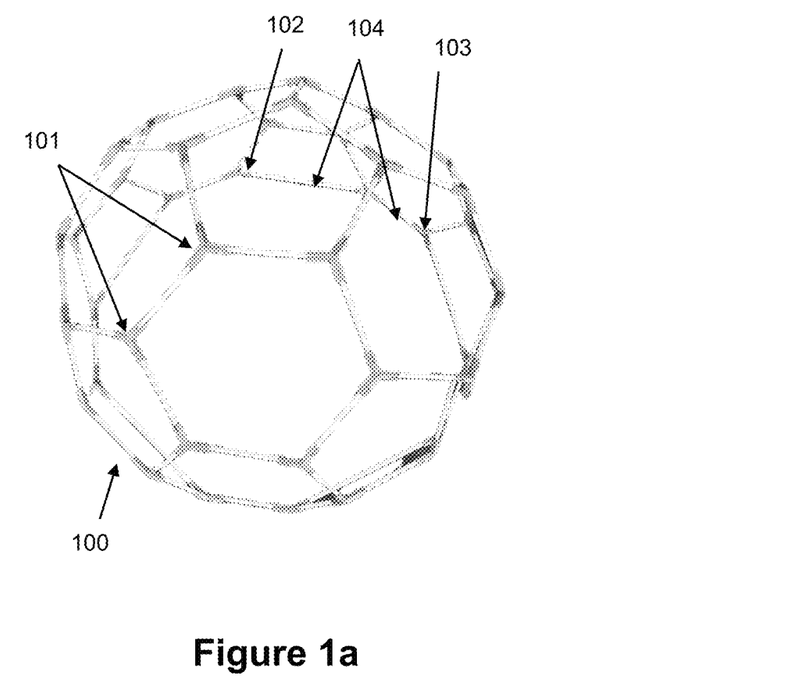
FIG. 1a illustrates an embodiment of a collapsible truncated icosahedron dome (100) assembled using connectors and rods.
Figure 1B:
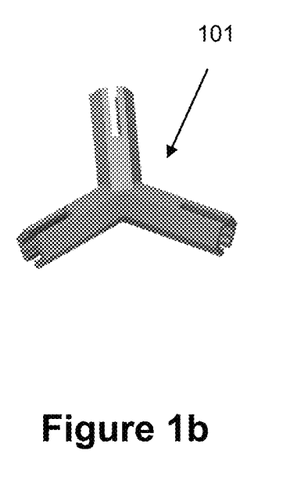
Figure 1C:
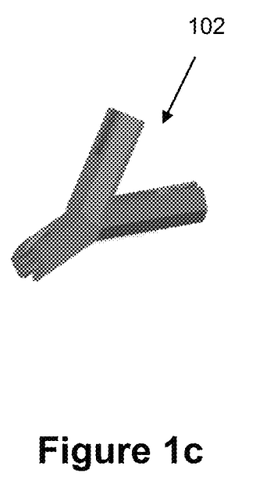
Figure 1D:
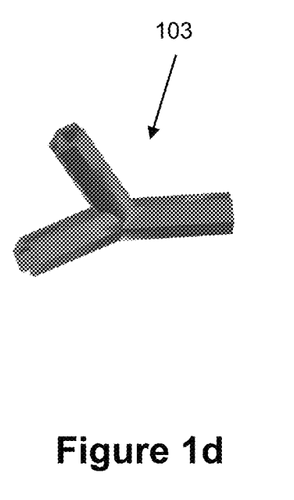

FIG. 1a illustrates an embodiment of a collapsible truncated icosahedron dome (100) assembled using connectors and rods. FIG. 1b (101) is the connector used to connect rods in the main body of the dome. FIG. 1c (102) is the connector used to connect rods at the base of the dome on the left side, and FIG. 1d (103) is the connector used to connect rods at the base on the right side. Although the present disclosure sets forth use of an icosahedron dome, a geodesic dome may be used without deviating from the spirit or scope of the invention.

Figure 2A:
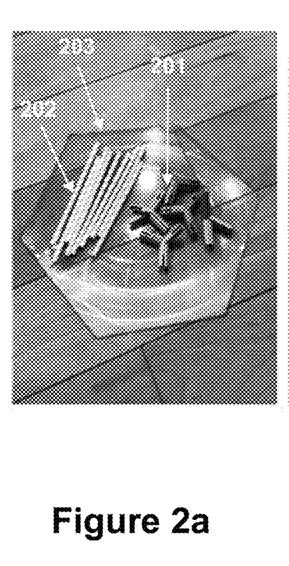
FIGS. 2a, 2b, and 2c illustrate the sequence of assembly of a truncated icosahedron dome (205) structure using simple connectors and rods and Fresnel lenses.
Figure 2B:
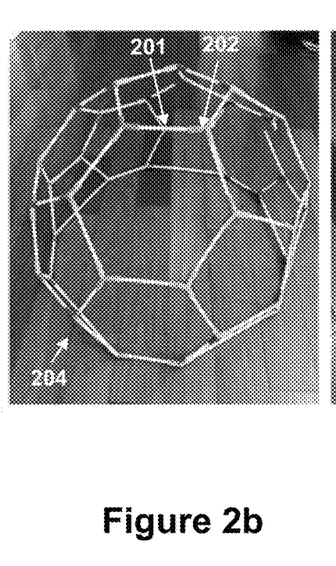
Figure 2C:
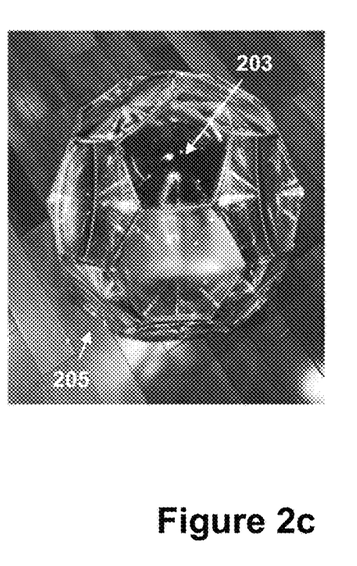

FIG. 2a illustrates components used in the assembly of the dome 205—connectors (201), rods (202), and Fresnel lenses (203)—that can be collapsed into a compact package for easy transportation. FIG. 2b illustrates an assembly of a skeletal dome structure (204) using connectors (201) and rods (202). FIG. 2c illustrates a truncated icosahedron Fresnel lens concentrator assembled using connectors (201), rods (202), and Fresnel lenses (203).

In a dome structure like this, the Fresnel lenses attached to the various facets of the dome are automatically oriented towards the sun as the sun shifts throughout the day, ensuring automatic tracking of the sun regardless of the dome's location.

Figure 3A:
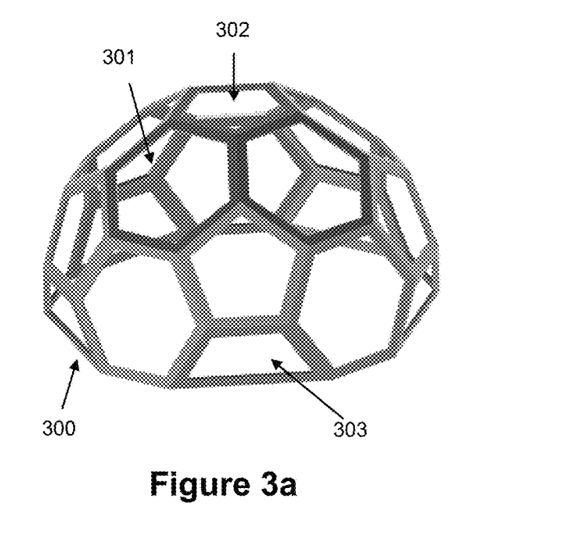
FIG. 3a illustrates a second embodiment of a collapsible truncated icosahedron dome (300) that is assembled using hexagonal, pentagonal, and trapezoidal frames as connecting elements.
Figure 3B:
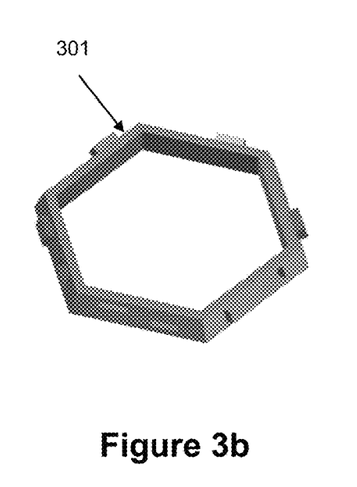
FIG. 3b, FIG. 3c, and FIG. 3d show three types of frame structures—Hexagon frame (301), Pentagon frame (302), and a Trapezoid Frame (303)—that are used to assemble the truncated icosahedron dome 300.
Figure 3C:
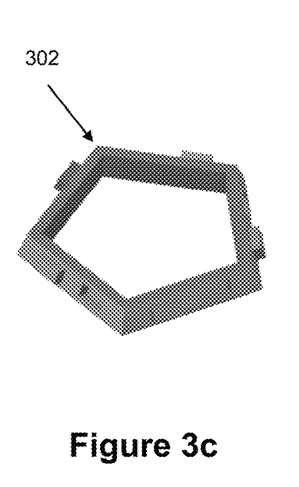
Figure 3D:
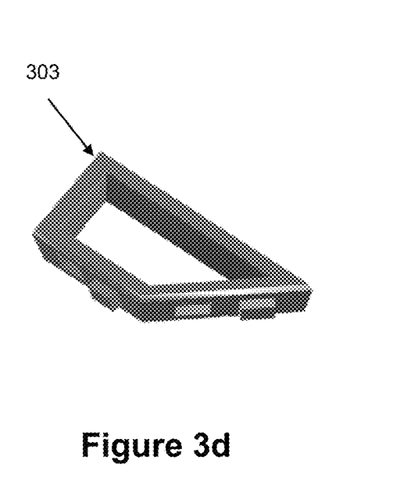

The first critical element of the innovation is the collapsible dome concentrator. FIGS. 1a and 3a illustrate two possible designs for a collapsible truncated icosahedron dome concentrator. The embodiment illustrated in FIG. 3a creates an assembly process that is easier than the embodiment illustrated in FIG. 1a and it also creates a more stable framework for the concentrator. Both of the dome structures illustrated in FIGS. 1 and 3 have been designed to be collapsible and can be assembled using ultra-low-cost subcomponents, including connectors (101, 102, 103) and rods (104), as illustrated in FIG. 1a, or frames (301, 302, 303) that snap together, as shown in FIG. 3a. Both domes can be assembled very rapidly and installed without needing to be sensitive to orientation due to their dome profile. This dome-shaped concentrator also eliminates the need for an expensive tracking system and is very low maintenance, as it allows the sun to be tracked throughout the day without any mechanical moving parts.

Figure 4:
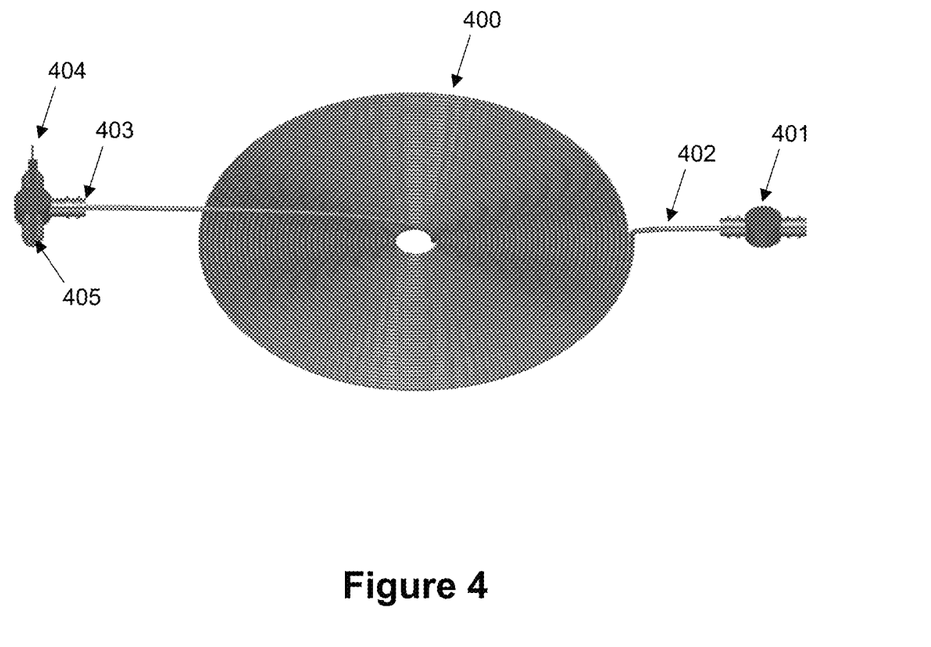
FIG. 4 illustrates a coil-based water transportation system (400) that will be placed at the bottom of the concentrator dome through which water will be transported in and out of the dome.

A second key aspect of the innovation that allows water to be heated to the required temperature without the need for a large solar collection surface is the system's efficient water transportation system. The use of very narrow copper tubes that spirally traverse the base of the dome (400), as shown in FIG. 4, is another critical design element. Such a structure enables a narrow cross-section of the coil to be heated up at a localized spot, and water passing through the coil at that point reaches very high temperatures very rapidly, killing the microbes. This, coupled with an active transportation of water through the coil, enables the continuous generation of clean water throughout the day.

Referring to FIG. 4, water enters the coil from a hose connected to the copper coil through a compression fitting adapter (401) on one end. The copper coil is then shaped into a spiral loop with a diameter smaller than that of the dome, allowing it to be placed at the base of the dome. Once the wound coil reaches the center of the dome, it is bent and extended to the other side to exit the dome. On the other end, the coil is attached to a T-connector via a compression fitting adapter (403). At one end of the T-connector is a temperature sensor (404) that detects the system's temperature at the exit point. This temperature sensor is used to regulate the flow of a solenoid valve (405) located on the other side of the T-connector via a controller board (500).

Figure 5:
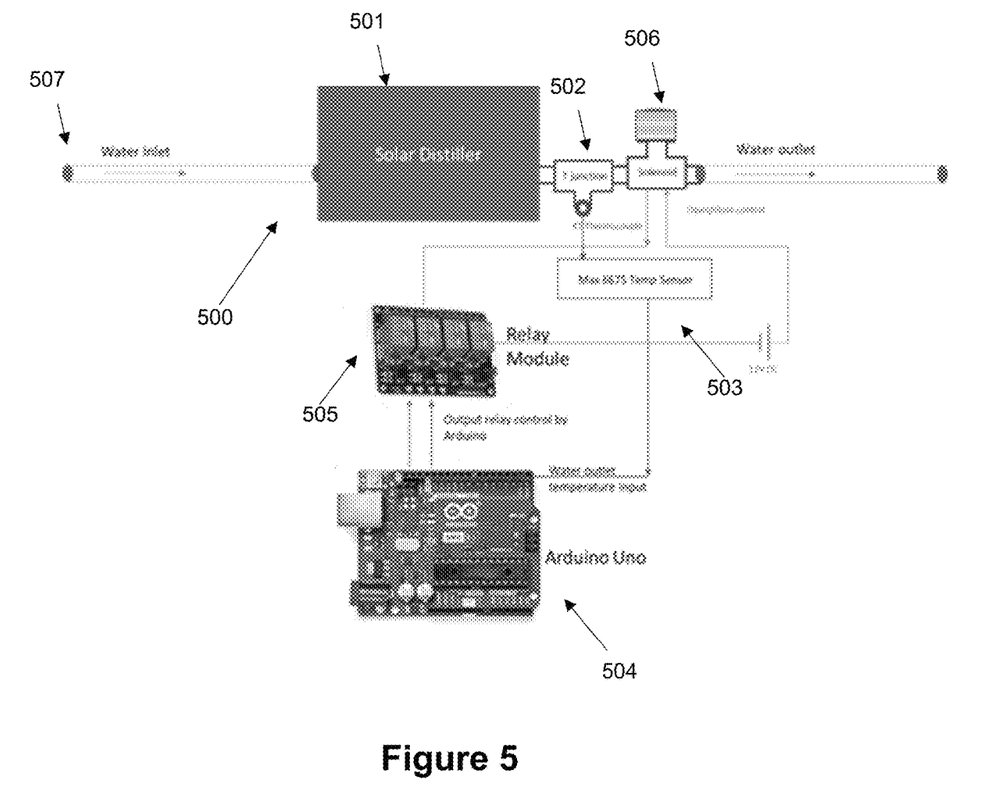
FIG. 5 is the schematic of the controller architecture used to regulate the water flow in and out of the coil under the solar concentrator.

A key element of the design that enables clean water to be generated from the system is its smart controller, illustrated in FIG. 5. The smart controller enables the water to reach the desired temperature before it exits the system, which is crucial for water purification. This enables the system to continuously generate water throughout the day without requiring manual monitoring or intervention.

Referring to FIG. 5, water enters the water transportation system from a water source, such as a tap, at one end (507), into a spiral copper coil inside the solar water concentrator (501). The end of the spiral coil terminates in a T-junction (502). One end of the T-junction is connected to a temperature sensor (503), which feeds into an Arduino controller (504). This controller triggers a relay (505) when the programmed temperature is reached. The relay (505) triggers the solenoid valve (506), which is connected to the other end of the T-junction (502), to release water from the coil when the programmed temperature is reached.

Figure 6:
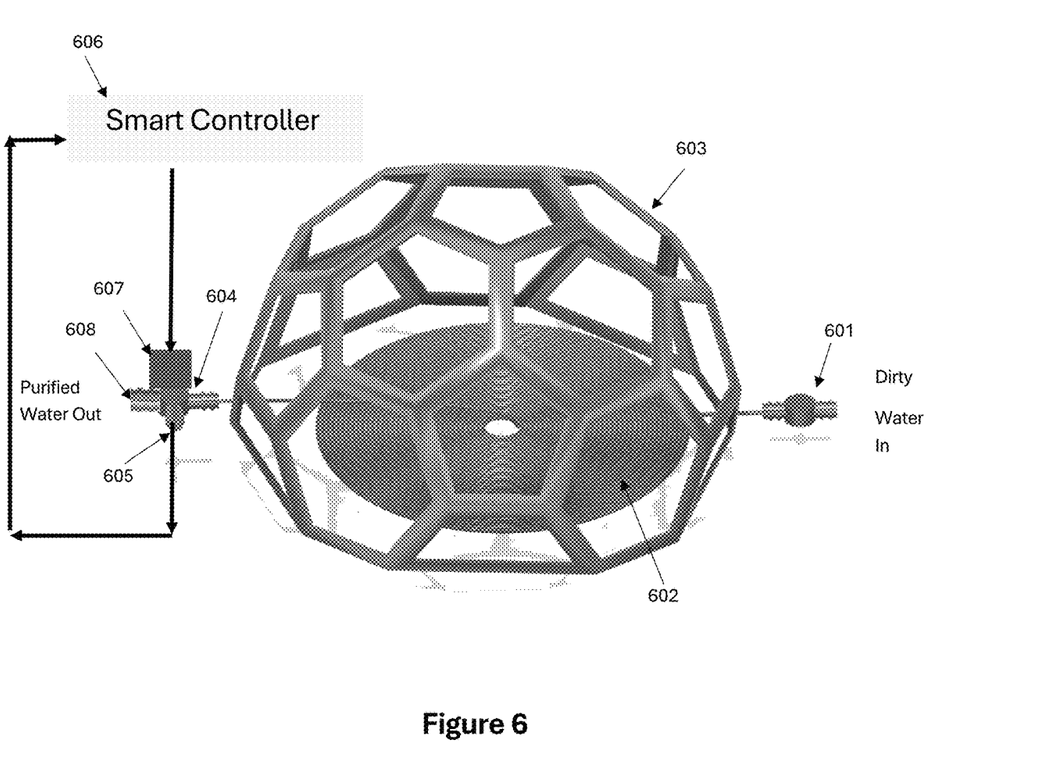
FIG. 6 is a schematic of the full product at the system level.

Referring to FIG. 6, unpurified water enters the water transportation coil under the dome at point 601 from a source, like a tap. As the water travels through the coil, it is heated by the concentration of the light from the various facets of the dome, depending on the time of day. The water heated in the coil is transported to the end of the coil 604. A temperature sensor, 605, located at the exit of the coil measures the water temperature and transmits that data to the smart controller, which regulates a Solenoid valve placed at 607, allowing the water to flow when the programmed temperature is reached.

In summary, all three of these innovations serve a purpose. The collapsible dome enables the concentration of sunlight without a need for a tracking system. The narrow copper pipe-based water transportation system enables a very small amount of water to be heated at the point of concentration, thereby reducing the need for very large concentration lenses and thereby allowing sufficient heat to be generated from lenses placed on each facet of the dome. And finally, the smart controller allows water to be retained in the coil under the concentrator till it reaches a sufficient temperature to enable water purification.

What is claimed is:

1. A water purification system, comprising:
    a dome-shaped structure that houses a plurality of concentrator lenses aligned with multiple facets of the dome-shaped structure, wherein the concentrator lenses concentrate light toward a focal region at the base of the dome-shaped structure throughout the day without the need for a mechanical tracker;
    a water transportation system comprising a spiral-shaped fluid conduit, located at the focal region at the base of the dome-shaped structure such that the concentrated light impinges directly on a portion of the spiral-shaped fluid conduit to heat only a micro-volume of water flowing within the portion; and
    a controller comprising a temperature sensor placed at the output of the water transportation system, wherein the controller causes the water transportation system to output purified water when the water reaches a specified temperature for a specified period of time.

2. The water purification system as set forth in claim 1, wherein the dome-shaped structure comprises an icosahedron dome.

3. The water purification system as set forth in claim 2, wherein the dome-shaped structure comprises a collapsible dome structure that allows the dome to be collapsed into its facets, which can be stacked for easy transportation and reassembled on site.

4. The water purification system as set forth in claim 3, wherein the dome-shaped structure comprises a hexagon frame, pentagon frame, and a trapezoid frame to assemble the collapsible icosahedron dome.

5. The water purification system as set forth in claim 1, wherein the concentrator lenses comprise Fresnel lenses.

6. The water purification system as set forth in claim 1, wherein the spiral-shaped fluid conduit comprises a spiral-shaped coil of metal tubes to enable a narrow cross-section of the coil to be heated up at a localized spot from one of the concentrator lenses.

7. The water purification system as set forth in claim 6, wherein the metal tubes comprise copper tubes painted black.

8. The water purification system as set forth in claim 1, wherein the controller comprises a solenoid valve, under control of the temperature sensor, which opens to maintain flow of the purified water at the specified temperature for the specified period, ensuring sufficient purified water is released when the solenoid valve is opened.

9. A water purification system, comprising:
    an icosahedron dome that houses a plurality of Fresnel lenses aligned with multiple facets of the icosahedron dome, wherein the concentrator lenses concentrate light at the base of the dome throughout the day without the need for a mechanical tracker;
    a water transportation system comprising a spiral-shaped coil of metal tubes, located at the focal region at the base of the icosahedron dome such that the concentrated light impinges directly on a portion of the spiral-shaped coil of metal tubes to heat only a micro-volume of water flowing within the portion of the spiral-shaped coil of metal tubes; and
    a controller comprising a temperature sensor placed at the output of the water transportation system, wherein the controller causes the water transportation system to output purified water when the water reaches a specified temperature for a specified period of time.

\* \* \* \* \*